US012739033B2

(12) United States Patent
Loprieno et al.

(10) Patent No.: US 12,739,033 B2
(45) Date of Patent: Sep. 15, 2026

(54) INCREASING BURST ERROR TOLERANCE ON OTN

(71) Applicant: Cisco Technology, Inc., San Jose, CA (US)

(72) Inventors: Gilberto Loprieno, Millano (IT); Emanuele Umberto Giacometti, Cernusco Sul Naviglio (IT); Davide Codella, Mariano Comense (IT)

(73) Assignee: Cisco Technology, Inc., San Jose, CA (US)

( * ) Notice: Subject to any disclaimer, the term of this patent is extended or adjusted under 35 U.S.C. 154(b) by 42 days.

(21) Appl. No.: 18/485,879

(22) Filed: Oct. 12, 2023

(65) Prior Publication Data

US 2025/0125876 A1 Apr. 17, 2025

(51) Int. Cl.
*H04B 10/516* (2013.01)
*H04L 1/00* (2006.01)

(52) U.S. Cl.
CPC ......... *H04B 10/516* (2013.01); *H04L 1/0041* (2013.01); *H04L 1/0071* (2013.01)

(58) Field of Classification Search
CPC ....... H04L 1/00; H04L 1/0041; H04L 1/0071; H04L 1/0075; H04L 1/0078; H03M 13/27; H04J 3/1652; H04J 14/0208; H04B 10/516; H04B 10/25; H04B 10/00; H04B 10/67
See application file for complete search history.

(56) References Cited

U.S. PATENT DOCUMENTS 6,683,855 B1 * 1/2004 Bordogna ............ H04L 1/0083 370/244
7,028,241 B1 * 4/2006 Blair .................... H04L 1/0041 714/752
7,917,833 B2 * 3/2011 Mizuochi ............ H04L 1/0071 714/787
8,213,446 B2 * 7/2012 Meagher .............. H04L 1/0071 370/419
9,008,188 B2 * 4/2015 Mueller ............ H03M 13/1171 375/240.26
9,112,529 B1 8/2015 Mazahreh et al.
10,200,116 B2 * 2/2019 Kitamura ............. H04L 49/552
10,256,915 B2 * 4/2019 Su ....................... H04B 10/516
10,505,676 B1 * 12/2019 Humblet .......... H03M 13/2906
2005/0068995 A1 3/2005 Lahav et al.
2005/0149820 A1 * 7/2005 Gastaldello ....... H03M 13/3746 714/758
2008/0267622 A1 10/2008 Loprieno
2013/0311848 A1 * 11/2013 Purohit ................ H04L 1/0057 714/752
2014/0270780 A1 * 9/2014 Calderon ............. H04L 1/0057 398/79

(Continued)

*Primary Examiner* — Albert Decady
*Assistant Examiner* — Grace V Braden
(74) *Attorney, Agent, or Firm* — Patterson + Sheridan, LLP

(57) ABSTRACT

Embodiments herein describe re-ordering bit-interleaved data to be byte-interleaved data before transmitting the data on an OTN. For example, a transmitter can receive interleaved bits for different symbols that are part of an error correction code to be transmitted in an optical transport network. The transmitter re-orders the interleaved bits into interleaved bytes where each of the interleaved bytes correspond to one of the different symbols. The interleaved bytes can then be transmitted on the OTN.

17 Claims, 6 Drawing Sheets

(56) References Cited

U.S. PATENT DOCUMENTS

| | | | | |
|---|---|---|---|---|
| 2015/0003827 | A1* | 1/2015 | Calderon ............. | H04B 10/516<br>398/43 |
| 2015/0270928 | A1 | 9/2015 | Levy et al. | |
| 2016/0344512 | A1 | 11/2016 | Calderon et al. | |
| 2017/0353258 | A1* | 12/2017 | Hara ....................... | H04J 14/08 |

* cited by examiner

INCREASING BURST ERROR TOLERANCE ON OTN

TECHNICAL FIELD

Embodiments presented in this disclosure generally relate to reordering bit-interleaved data into byte-interleaved data before transmitting the data using an optical transport network (OTN).

BACKGROUND

Legacy OTN signals (such as Optical Channel Transport Unit 4 (OTU4)) are transported by Not Return to Zero (NRZ) signals like Optical channel Transport Lane 4.4 (OTL4.4). Ethernet signals (100GE/200/400/800GE) are currently based on multilevel signals (e.g., Pulse amplitude Modulation 4 (PAM4)). A PAM4 symbol transports 2 bits while NRZ signal transports only a single bit. OTL4.2 and OTL4.4 use bit interleaving. Specifically, OTL4.2 interleaves bits from two OTL4.4 lanes, but because Forward Error Correction (FECs) as defined by International Telecommunication Union (ITU)-G.709 can correct only up to 8 symbols, this means a FEC can correct only 8 contiguous bit errors. That is, an error burst of any more than 8 bits results in an uncorrectable code word. This low error burst tolerance is also a problem with OTL4.1.

PAM4 uses a digital signal processor (DSP) to process the received signals. For example a DSP that uses a Decision Feedback Equalizer (DFE) relies on decisions about the levels of previous symbols (high/low) to correct the current symbol. This allows the DFE to account for distortion in the current symbol that is caused by the previous symbols causing inter-symbol interference (ISI) without amplifying the noise. Because of this, a single error affects other received bits causing a burst error. Further, PAM4 reduces the ratio between noise and signal relative to NRZ which means these PAM4 can result in higher bit errors rates. This makes the low error burst tolerance associated with OTL4.1, OTL4.2, and OTL4.4 an even larger problem.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
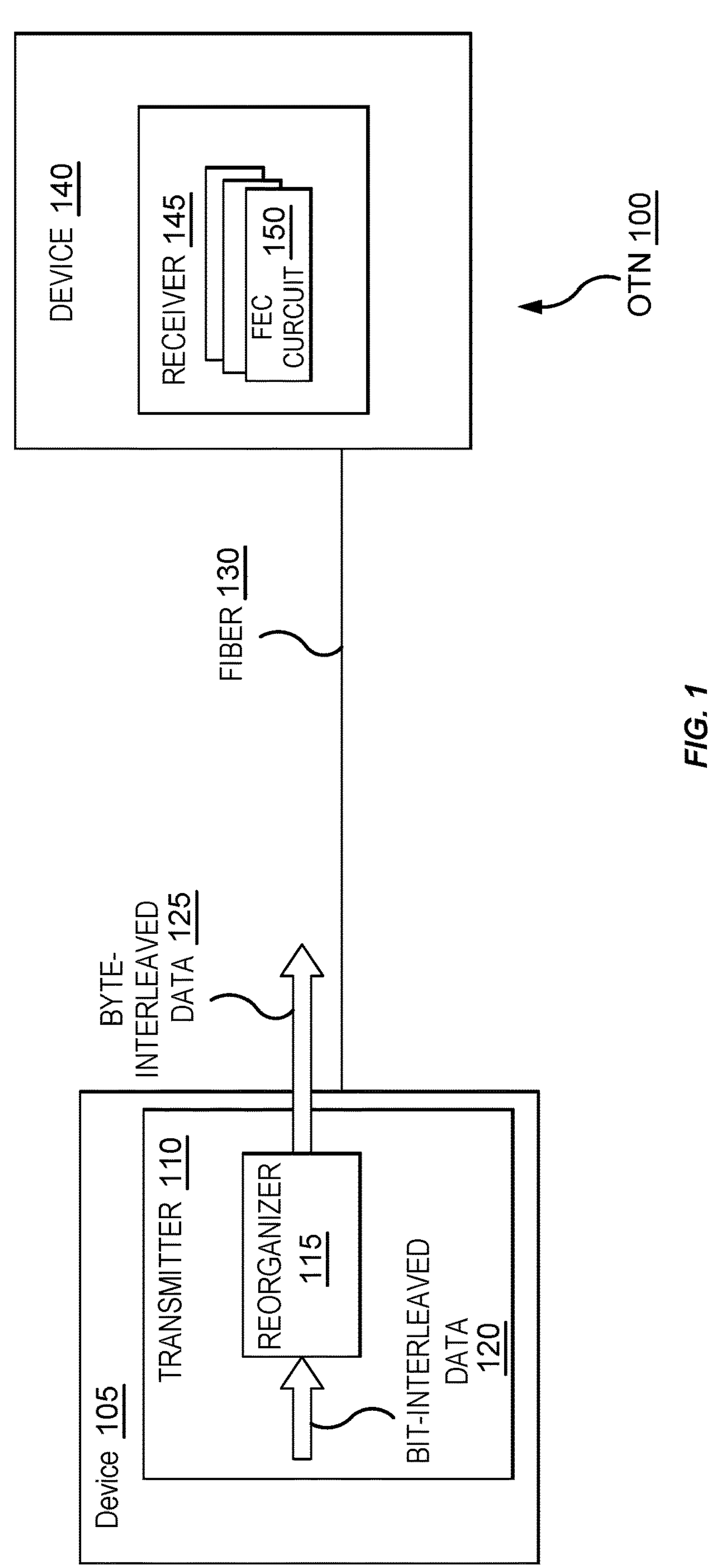
FIG. 1 illustrates a system for re-ordering bit-interleaved data into byte-interleaved data, according to one embodiment.

One embodiment presented in this disclosure is a device that includes a transmitter configured to receive interleaved bits for different symbols to be transmitted in an optical transport network (OTN), re-order the interleaved bits into interleaved bytes, wherein each of the interleaved bytes correspond to one of the different symbols, and transmit the interleaved bytes on the OTN.

Another embodiment presented in this disclosure is a method that includes providing, at a transmitter, interleaved bits for different symbols to be transmitted in an optical transport network (OTN); re-ordering the interleaved bits into interleaved bytes where each of the interleaved bytes correspond to one of the different symbols, and transmitting the interleaved bytes on the OTN to a receiver.

Another embodiment presented in this disclosure is a device that includes a receiver configured to receive interleaved bytes from a transmitter in an OTN where each of the interleaved bytes corresponds to different symbols of an error correction code and where interleaved bytes were re-ordered from interleaved bits at the transmitter. The device also includes a first FEC circuit configured to correct errors in the interleaved bytes.

Example Embodiments

Embodiments herein describe re-ordering bit-interleaved data to be byte-interleaved data before transmitting the data on an OTN. That is, current OTLs provide data to a transmitter that is bit-interleaved where each consecutive bit is part of a different symbol of an error correction scheme. For example, a lane may provide, as consecutive bits, a first bit for Symbol 0 of a Reed-Solomon (RS) code, a first bit for Symbol 1 of the RS code, a first bit for Symbol 2 of the RS code, and so forth. The receiver may include error correction circuitry (e.g., forward error correction (FEC)) that can correct errors in only a maximum number of symbols (e.g., 8 symbols out of the X total number of symbols in a RS code). If there are errors in nine consecutive bits of the bit-interleaved data, this introduces errors into nine symbols, which exceeds the capability of the error correction circuitry which makes the RS code word uncorrectable at the receiver.

The embodiments herein re-order bit-interleaved data received on the OTLs into byte-interleaved data. The byte-interleaved data can include, as consecutive bytes, a byte for Symbol 0 of a RS code, a byte for Symbol 5 of the RS code, a byte for Symbol 1 of the RS code, a byte for Symbol 6 of the RS code, and so forth. In this scenario, an error in nine consecutive bits of the bit-interleaved data at most affects two symbols of the RS code, which is within the capabilities of the error correction circuitry. For example, error correction circuitry that can correct errors in eight symbols can tolerant up to 64 consecutive bit errors when the data is byte-interleaved, which greatly increases the error burst tolerance compared to transmitting bit-interleaved data. This can make the OTN more reliable, especially when using PAM4 which has a lower ratio between noise and signal than NRZ.

In one embodiment, the transmitter uses a memory (e.g., a first-in-first out (FIFO)) to reorder bit-interleaved data into byte-interleaved data. For example, the bits can be stored in one column of the memory. The dimensions of the memory can be set so that doing so results in the bits from one byte of a symbol being stored in each row of the memory. For example, a byte of data from Symbol 0 is stored in a first row of the memory, a byte of data from Symbol 1 is stored in a second row of the memory, and so forth. Thus, when a row of the memory is read, it includes a byte of data from one symbol. This byte of data can be interleaved with bytes of data from other symbols and transmitted on the OTN.

FIG. 1 illustrates an OTN 100 for re-ordering bit-interleaved data into byte-interleaved data, according to one embodiment. The OTN 100 includes two devices where a device 105 includes a transmitter 110 and a device 140 includes a receiver 145. In one embodiment, the devices 105, 140 have both a transmitter and a receiver for bi-directional communication.

The devices 105, 140 can be any device that transmits or receives optical signals using an OTN 100. For example, the devices 105, 140 can be line cards, optical modules, optical network devices, transponders, and the like.

As shown, the transmitter 110 receives (or provides) bit-interleaved data 120. While described in more detail below, in one embodiment, the bit-interleaved data 120 includes consecutive bits from different symbols of an error correction technique, such as Reed-Solomon. For example, a first bit may be from Symbol 0 of a RS code word, a second bit may be from Symbol 1 of the same RS code word, the third bit may be from Symbol 2 of the same RS code word, and so forth.

Although not shown, in one embodiment, the receiver 145 may include an interface (e.g., an OTL4.4 or OTL4.2 interface) that generates digital signals containing the bit-interleaved data 120. However, the embodiments herein are not limited to a particular type of OTL interface, but rather any interface that generates bit-interleaved data 120.

The transmitter 110 includes a reorganizer 115 for reordering (or converting) the bit-interleaved data 120 into byte-interleaved data 125. In one embodiment the reorganizer 115 may include hardware (e.g., circuitry) for generating the byte-interleaved data 125. However, in other embodiments, the reorganizer 115 can include firmware, or rely on software, to generate the byte-interleaved data 125.

In one embodiment, the reorganizer 115 fetches the bits in the bit-interleaved data 120 that are part of the same symbol, stores them, and then generates the byte-interleaved data 125 where each byte of data includes at least 8 bits from the same symbol. The symbols can then be interleaved. One exemplary implementation of the reorganizer 115 is discussed in FIG. 3 below.

In one embodiment, the reorganizer 115 generates digital signals that include the byte-interleaved data 125. These digital signal are then converted into optical signals that are transmitted on an optical fiber 130 to the device 140. The optical fiber 130 can have any length.

As the byte-interleaved data 125 travels along the fiber 130, errors can occur in the optical signals. Errors can incur when NRZ is used to transmit the data 125, but errors are more likely to occur when PAM4 is used. In some scenarios, a burst of errors can occur where multiple consecutive bits are corrupted. One advantage of using an error correction technique such as RS, is that these errors can be detected and corrected at the receiver 145. In this example, the receiver 145 includes multiple FEC circuits 150 which are tasked with detecting and correcting bit errors.

In one embodiment, each FEC circuit 150 can correct a maximum number of symbols in a code word. This maximum number can vary, but for ease of explanation it is assumed that each FEC circuit 150 can correct up to 8 symbols in each code word. For instance, there can be up to 8 symbols in a particular code word for that code word to be correctable. If there are bit errors in 9 or more of the symbols in a code word, the code word is an uncorrectable code word.

One advantage of transmitting the byte-interleaved data 125 rather than the bit-interleaved data 120 on the optical fiber 130 is that the byte-interleaved data 125 is more tolerant of burst errors where multiple consecutive bits are corrupted. For example, assuming the bit-interleaved data 120 was transmitted on the fiber 130, if there are errors in 9 consecutive bits, where each bit is part of 9 different symbols, this will exceed the capability of the FEC circuit 150 to correct those errors. This means the code word containing those symbols is uncorrectable.

In contrast, when transmitting the byte-interleaved data 125 on the fiber 130, if there are errors in 9 consecutive bits, those 9 bits would at most be in two symbols. The FEC circuit 150 can then detect and correct those two symbols. Further, if there are errors in other symbols (up to six additional symbols), the FEC circuit 150 can correct those errors as well. In this manner, the byte-interleaved data 125 is much more tolerant of burst errors than the bit-interleaved data 120.

The burst tolerance can be increased further by using multiple FEC circuits 150. For example, ITU G-709 FEC is based on 16×FEC. The FEC circuits 150 can be byte interleaved, where 16 consecutive bytes are managed by 16 different FEC circuits 150, each handling a single bytes. In this way the burst tolerance is increased up to 16 (number of FEC used)×8 (maximum FEC symbol correction capability)×8 (symbol size)=16×8×8=1024 bits. Using multiple FEC circuits is discussed in FIGS. 4 and 5.

Although not limited to OTL 4.4, the following discussion provides some introductory information regarding this protocol. In OTL 4.4., data is distributed over four lanes where data is first aggregated into 16 bytes blocks and assigned to four rows. The 16 bytes are then distributed over 20 logical lanes where each logical lane transports 16 bytes. Moreover, each logical lane starts with the first byte of the 16-byte blocks. This results in the first bit of the first symbol corrected by a FEC circuit 160 always being in the first position on each of the 20 logical lanes.

OTL 4.4 applies a bit interleaving of the 20 logical lanes as defined in the following, where X is the byte and n is the bit of the byte:

$$X(n),\ X+1(n),\ X+2(n),\ X+3(n),\ X+4(n),\ X(n+1),\ X+1(n+1),\ X+2(n+1),\ X+3(n+1),\ X+4(n+1),\ X(n+2)\ \ldots \quad \text{Lane 0}$$

$$Y(n),\ Y+1(n),\ Y+2(n),\ Y+3(n),\ Y+4(n),\ Y(n+1),\ Y+1(n+1),\ Y+2(n+1),\ Y+3(n+1),\ Y+4(n+1),\ Y(n+2)\ \ldots \quad \text{Lane 1}$$

$$Z(n),\ Z+1(n),\ Z+2(n),\ Z+3(n),\ Z+4(n),\ Z(n+1),\ Z+1(n+1),\ Z+2(n+1),\ Z+3(n+1),\ Z+4(n+1),\ Z(n+2)\ \ldots \quad \text{Lane 2}$$

-continued $$T(n),\ T+1(n),\ T+2(n),\ T+3(n),\ T+4(n),\ T(n+1),\ T+1(n+1),\ T+2(n+1),\ T+3(n+1),\ T+4(n+1),\ T(n+2)\ \ldots \quad \text{Lane 3}$$

Because of interleaving, each lane transmits the symbols of RS code word 1 (RS1), then the symbols of RS code word 2 (RS2) until finally the symbols of RS code word 16 (RS16). Specifically, on each lane, one bit of Symbol 0 of RS1 is sent, then one bit of Symbol 1 of RS1, then one bit of Symbol 2 of RS1, and so forth.

Figure 2:
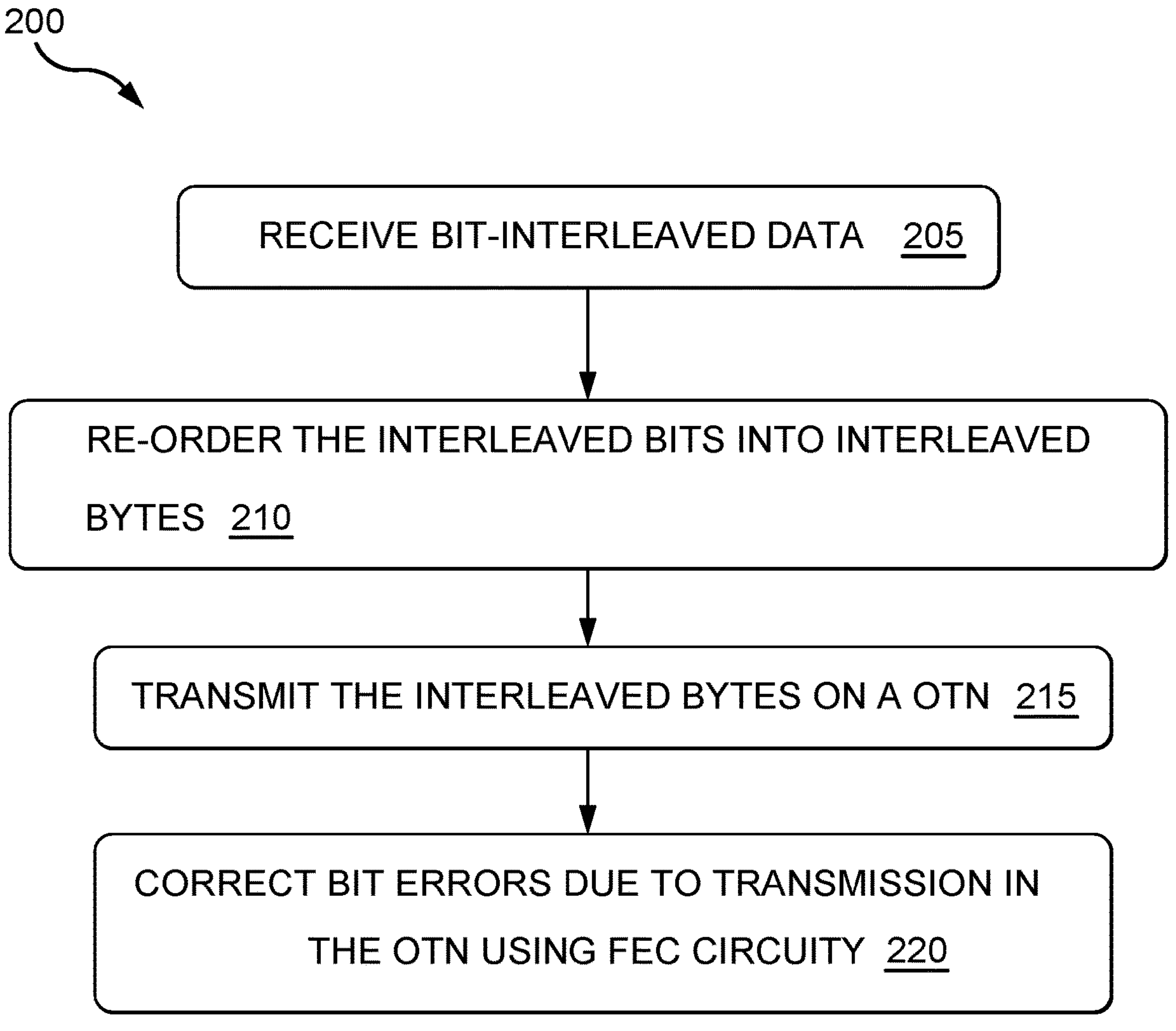
FIG. 2 is a flowchart for re-ordering bit-interleaved data into byte-interleaved data, according to one embodiment.

FIG. 2 is a flowchart of a method 200 for re-ordering bit-interleaved data into byte-interleaved data, according to one embodiment. For ease of explanation, the method 200 is discussed in tandem with FIG. 3 which illustrates re-ordering bit-interleaved data in two OTL4.4 lanes into a byte-interleaved data channel, according to one embodiment.

Figure 3:
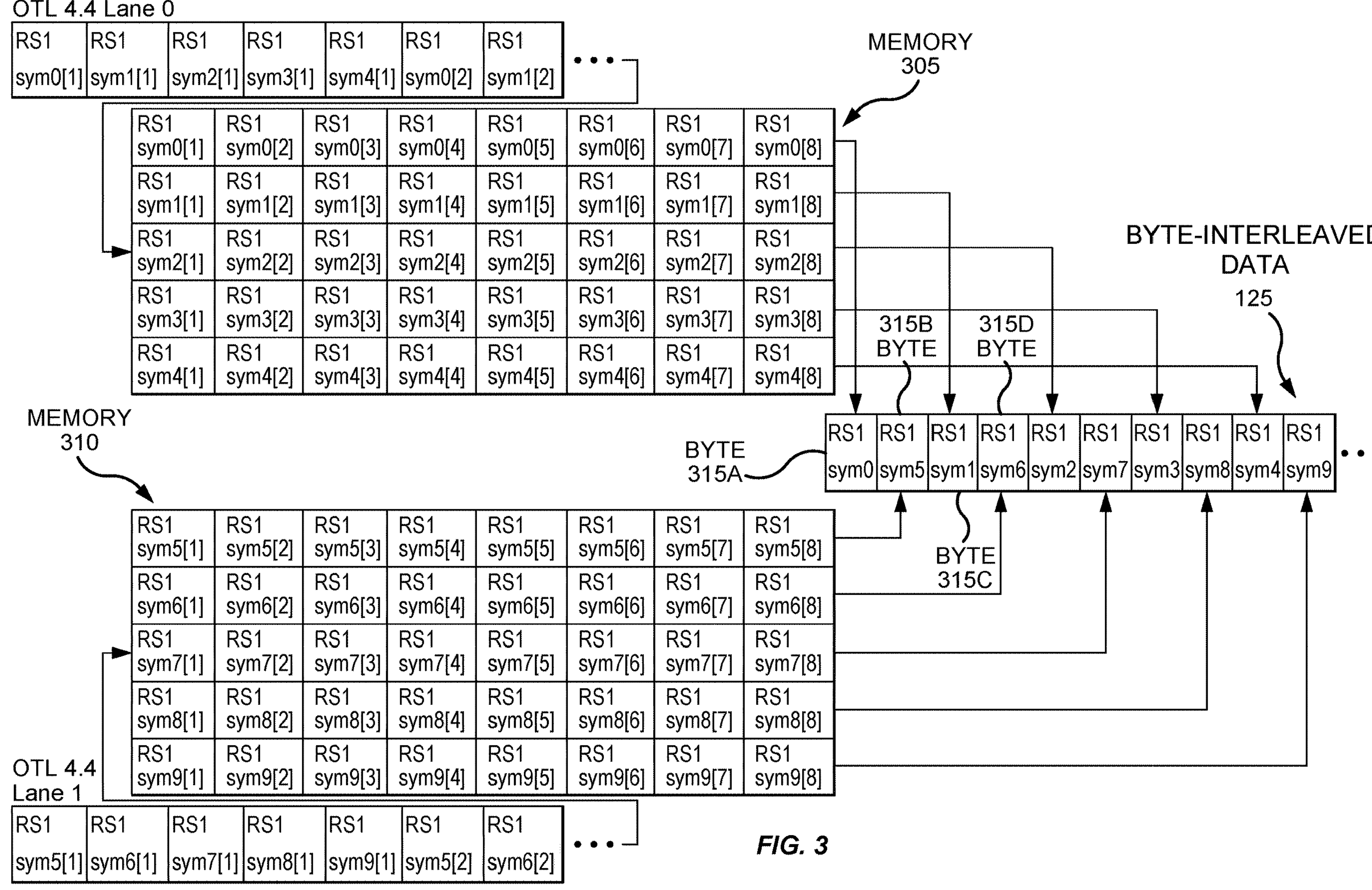
FIG. 3 illustrates re-ordering bit-interleaved data in two OTL4.4 lanes into a byte-interleaved data channel, according to one embodiment.

At block 205, the transmitter in a device (e.g., the device 105 in FIG. 1) receives bit-interleaved data. In one embodiment, the bit-interleaved data is received on multiple lanes (e.g., lanes that are compatible with OTL 4.4). For example, FIG. 3 illustrates receiving bit-interleaved data on OTL 4.4 Lane 0 and bit-interleaved data on OTL 4.4 Lane 1. Specifically, Lane 0 transmits a first bit for Symbol 0 of a first RS code word (i.e., RS1 sym0 [1]), then a first bit for Symbol 1 of the first RS code word (i.e., RS1 sym1 [1]), then a first bit for Symbol 2 of the first RS code word (i.e., RS1 sym2 [1]), and then a first bit for Symbol 3 of the first RS code word (i.e., RS1 sym3 [1]). Lane 0 then repeats through the symbols again, but this time transmitting the second bits of the Symbol 0-4. This continues until Lane 0 transmits 8 bits (one byte) for Symbol 1-4.

Lane 1 transmits a first bit for Symbol 5 of the first RS code word (i.e., RS1 sym5 [1]), then a first bit for Symbol 6 of the first RS code word (i.e., RS1 sym6 [1]), then a first bit for Symbol 7 of the first RS code word (i.e., RS1 sym7 [1]), then a first bit for Symbol 8 of the first RS code word (i.e., RS1 sym8 [1]), and then a first bit for Symbol 9 of the first RS code word (i.e., RS1 sym9 [1]). Lane 1 then repeats through the symbols again, but this time transmitting the second bits of the Symbol 5-9. This continues until Lane 1 transmits 8 bits (one byte) for Symbol 5-9.

At block 210, the transmitter (e.g., a reorganizer in the transmitter) re-orders the interleaved bits into interleaved bytes. To do so, FIG. 3 illustrates a memory 305 that stores the bits received on Lane 0, and a memory 310 that stores the bits received on Lane 1. In this example, consecutive bits are stored in a column-by-column manner. That is, the bit RS1 sym0 [1] is stored at the top entry of the first column in the memory 305, the bit RS1 sym1 [1] is stored at the second entry of the first column in the memory 305, the bit RS1 sym2 [1] is stored at the third entry of the first column in the memory 305, the bit RS1 sym3 [1] is stored at the fourth entry of the first column in the memory 305, and the bit RS1 sym4 [1] is stored at the fifth (bottom) entry of the first column in the memory 305.

After reaching the bottom of a column, the transmitter stores the next bits in the next column in the memory 305. That is, the bit RS1 sym0 [2] is stored at the first entry of the second column in the memory 305, the bit RS1 sym1 [2] is stored at the second entry of the second column in the memory 305, the bit RS1 sym2 [2] is stored at the third entry of the second column in the memory 305, and so forth.

The same process is performed for Lane 1 where its consecutive bits are stored in a column-by-column manner in the memory 310. That is, the bit RS1 sym5 [1] is stored at the top entry of the first column in the memory 310, the bit RS1 sym6 [1] is stored at the second entry of the first column in the memory 310, the bit RS1 sym7 [1] is stored at the third entry of the first column in the memory 310, the bit RS1 sym8 [1] is stored at the fourth entry of the first column in the memory 310, and the bit RS1 sym9 [1] is stored at the fifth (bottom) entry of the first column in the memory 310. The process then repeats where the second bits of the symbols 5-9 are stored in the second column of the memory 310.

In this example, the memories 305 and 310 have a depth of 5 and a width of 8. Thus, each memory 305, 310 can store 8 bits (one byte) for 5 symbols. The memories 305 and 310 are not limited to any particular implementation and can be FIFOs, SRAM, DRAM, etc.

By storing the interleaved bits from the Lanes 0 and 1 into the columns of the memories 305 and 310 (with their corresponding dimensions), this has the effect of re-ordering the bits into bytes. That is, each row of the memories 305 and 310 now store a byte for one symbol. That is, each bit in a row corresponds to the same symbol.

FIG. 3 illustrates reading out the data in the memories 305 and 310 in a row-by-row manner. That is, while the data is stored in the memories 305 and 310 column-by-column, the data is read from the memories 305 and 310 row-by-row. Further, in order to interleave the data with non-consecutive symbols, the data is alternatively read from the memories 305 and 310. That is, the bits of byte 315A of Symbol 0 are read out together from the first row of the memory 305. Then, the bits of byte 315B of Symbol 5 are read out together from the first row of the memory 310. Then, the bits of byte 315C of Symbol 1 are read out together from the second row of the memory 305. Then, the bites of byte 315D of Symbol 6 are read out together from the second row of the memory 310, and so forth. This results in generating the byte-interleaved data 125. In this manner, the bit-interleaved data received on two lanes (Lane 0 and Lane 1) is reordered into bytes and interleaved using the memories 305 and 310 to generate the byte-interleaved data 125.

This process can repeat as the bytes are read out of the memories 305 and 310 and more data is received on the Lanes 0 and 1. That is, the transmitter can continue to add to the byte-interleaved data 125 as more bit-interleaved data is received on the Lanes.

While the method 200 and FIG. 3 discuss storing the bit-interleaved data column-by-column and reading it out row-by-row, the process could be reversed where the bit-interleaved data is stored row-by-row and read out column-by-column. In that scenario, the dimensions of the memories 305 and 310 would be reversed. That is, instead of being 5×8 memories, they would be 8×5 memories.

At block 215, the transmitter transmits the interleaved bytes on an OTN. For example, the byte-interleaved data 125 is converted from digital signals into optical signals and transmitted to a receiver via one or more optical fibers.

At block 220, the receiver corrects bit errors due to transmission in the OTN using FEC circuitry. As mentioned above, while Reed-Solomon code words can be used, the embodiments herein can extend to other types of error correction codes such as Hamming codes. As mentioned above, because the data is transmitted in a sequence of bytes where each byte corresponds to a particular symbol of the code word, the FEC circuitry can correct larger burst errors than transmitting bit-interleaved data (i.e., data where bits from different symbols are interleaved).

Figure 4:
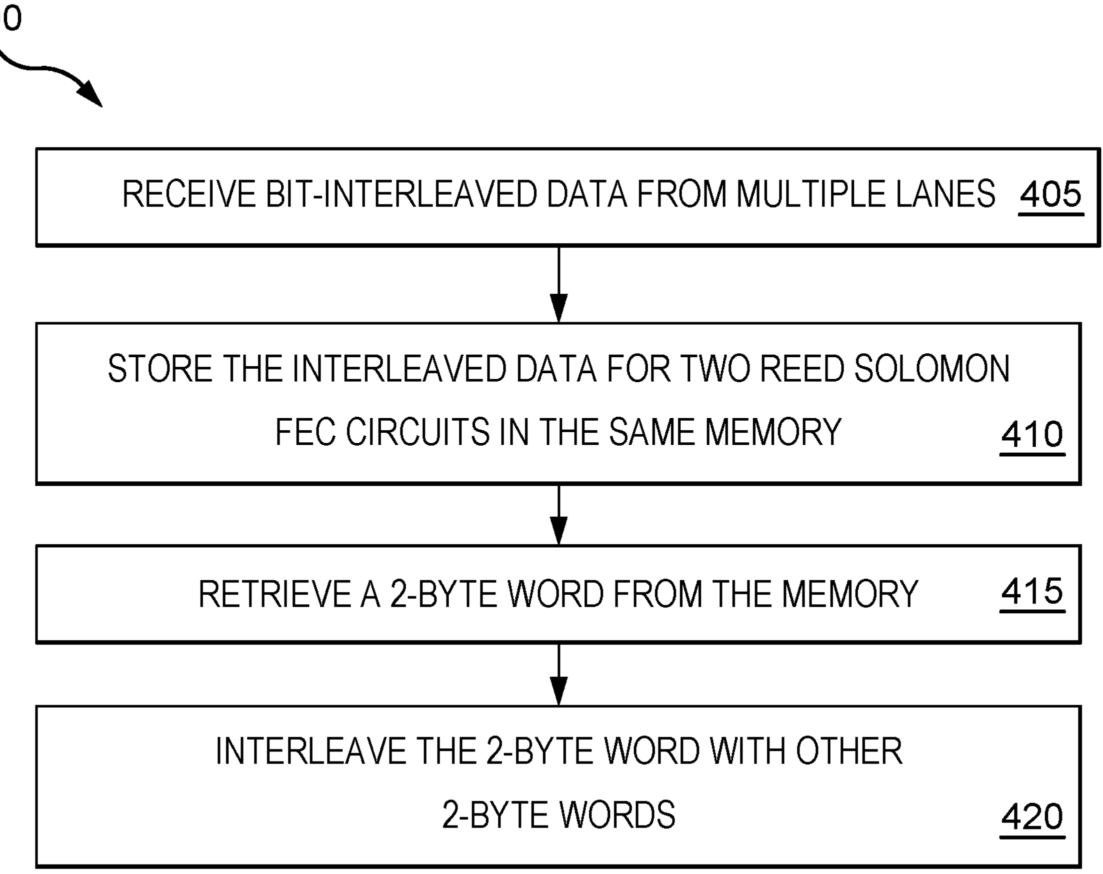
FIG. 4 is a flowchart for re-ordering bit-interleaved data into byte interleaved data for different correction circuits, according to one embodiment.

FIG. 4 is a flowchart of a method 400 for re-ordering bit-interleaved data into byte interleaved data for different correction circuits, according to one embodiment. For ease of explanation, the method 400 is discussed in tandem with FIG. 5 which illustrates re-ordering bit-interleaved data in four OTL4.4 lanes into bytes interleaved by different FEC circuits.

Figure 5:
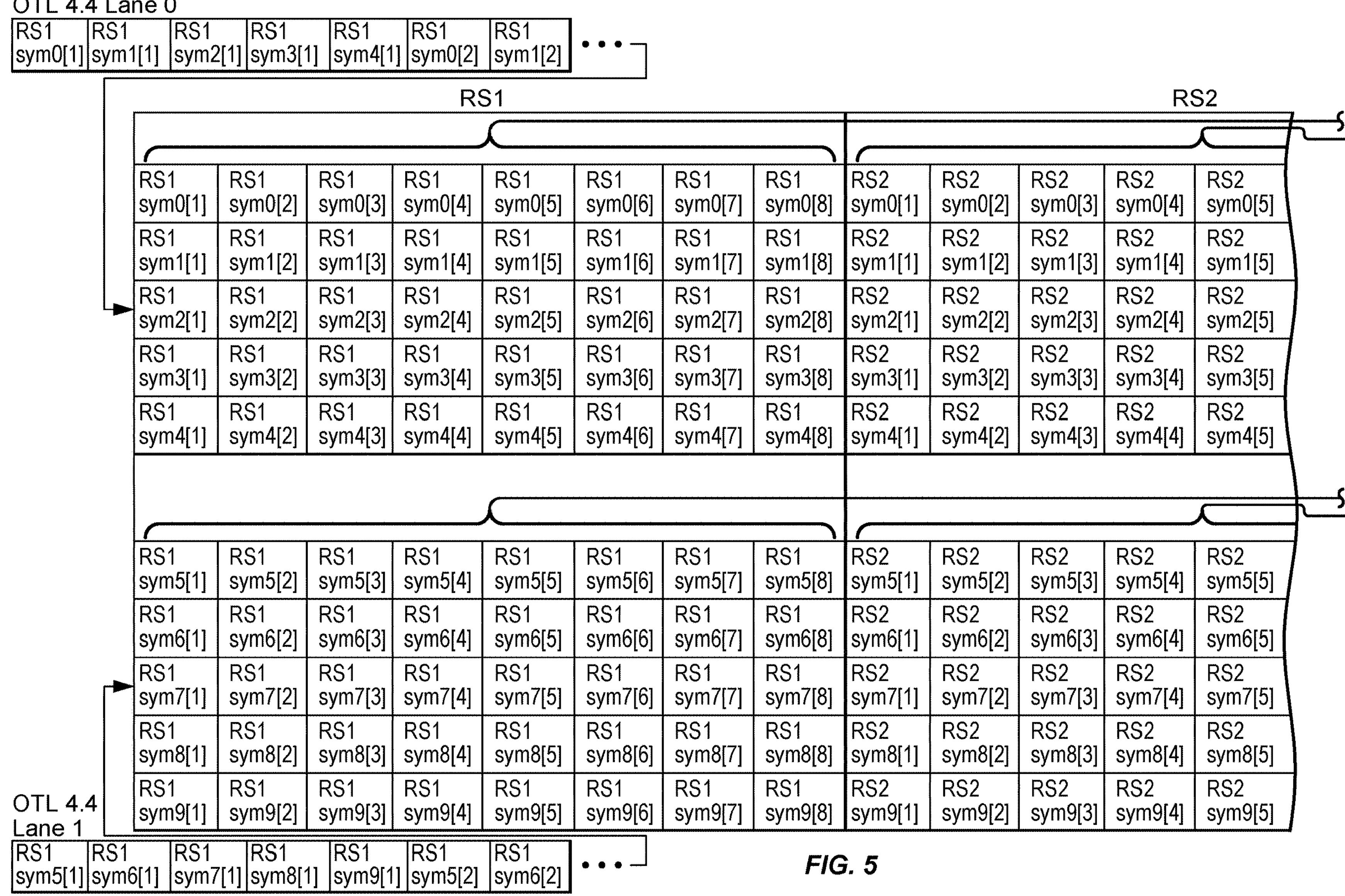
FIG. 5 illustrates re-ordering bit-interleaved data in two OTL4.4 lanes into bytes for different FEC circuits, according to one embodiment.
Figure 5:
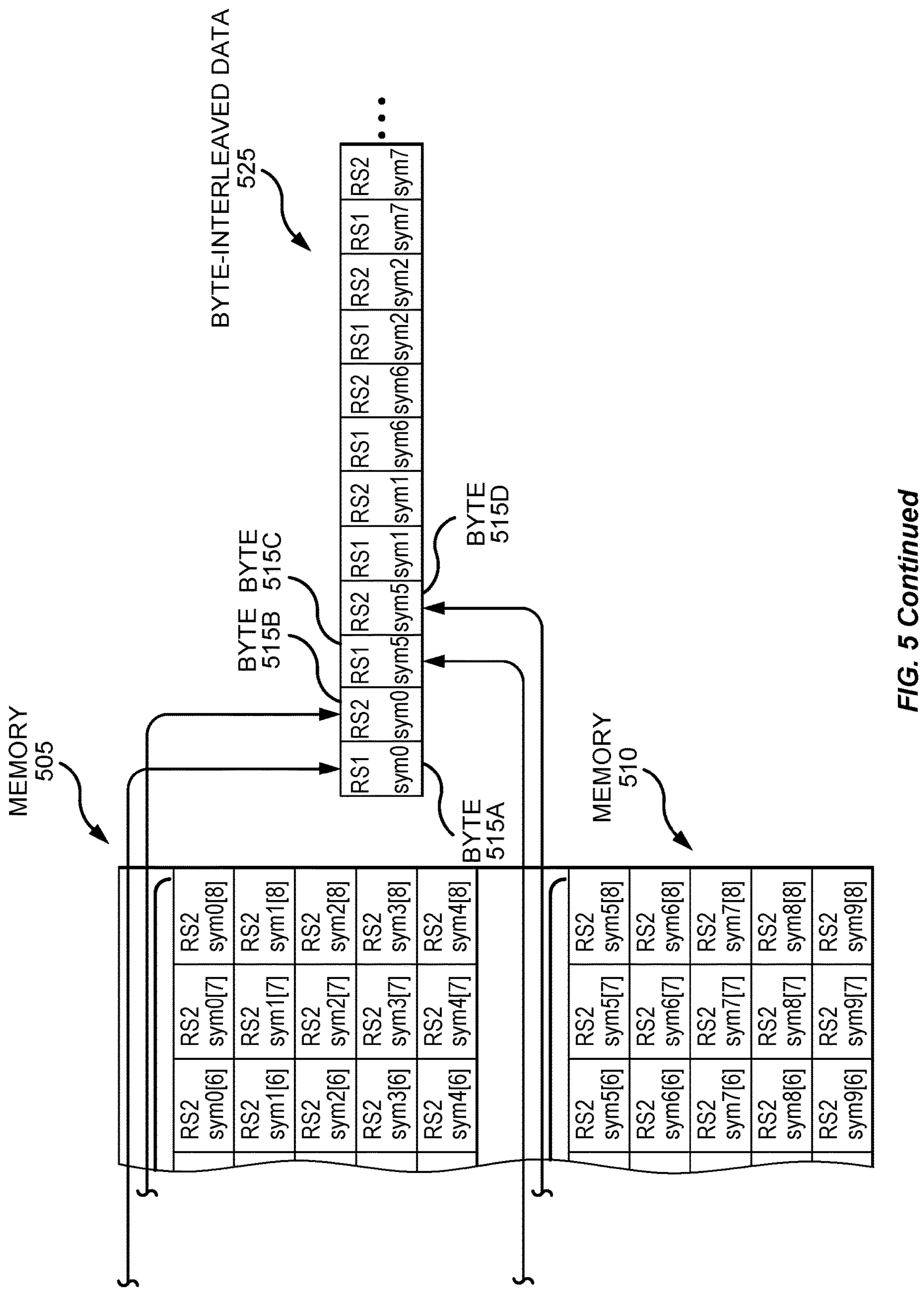

At block 405, like in method 200, the transmitter receives bit-interleaved data from multiple lanes—e.g., multiple OTL 4.4 lanes. For example, FIG. 5 illustrates receiving bit-interleaved data on OTL 4.4 Lanes 0-3. It is assumed the Lanes 0 and 1 in FIG. 5 transmit the same interleaved bits as the Lanes 0 and 1 illustrated in FIG. 3. After transmitting the bits for the symbols 0-4 of RS1, Lane 0 then transmits the bits for the symbols 0-4 of RS2 (e.g., a second code word). That is, Lane 0 transmits a first bit for Symbol 0 of a second RS code word (i.e., RS2 sym0 [1]), then a first bit for Symbol 1 of the second RS code word (i.e., RS2 sym1 [1]), then a first bit for Symbol 2 of the second RS code word (i.e., RS2 sym2 [1]), and then a first bit for Symbol 3 of the second RS code word (i.e., RS2 sym3 [1]). Lane 0 then repeats through the symbols again, but this time transmitting the second bits of the Symbols 0-4 for RS2. This continues until Lane 0 transmits 8 bits (one byte) for Symbols 0-4 for RS2.

Turning to Lane 1, after transmitting the bits for the symbols 5-9 of RS1, Lane 1 transmits a first bit for Symbol 5 of the second RS code word (i.e., RS2 sym5 [1]), then a first bit for Symbol 6 of the second RS code word (i.e., RS2 sym6 [1]), then a first bit for Symbol 7 of the second RS code word (i.e., RS2 sym7 [1]), then a first bit for Symbol 8 of the second RS code word (i.e., RS2 sym8 [1]), and then a first bit for Symbol 9 of the second RS code word (i.e., RS2 sym9 [1]). Lane 1 then repeats through the symbols again, but this time transmitting the second bits of the Symbol 5-9 of RS2. This continues until Lane 1 transmits 8 bits (one byte) for Symbol 5-9 of RS2.

At block 410, the reorganizer in the transmitter stores the interleaved data for two Reed-Solomon FEC circuits in the same memory. For example, one RS-FEC circuit is tasked with correcting bit errors in RS1 while a second RS-FEC circuit is tasked with correcting bit errors in RS2. FIG. 4 illustrates memory 505 which stores the bytes of symbols 0-4 of RS1 and the bytes of symbols 0-4 of RS2, and memory 510 which stores the bytes of symbols 5-9 of RS1 and the bytes of symbols 5-9 of RS2. As shown, the memories 505 and 510 have the same depth (e.g., 5) as the memories in FIG. 3, but have twice the width (e.g., 16) since they store symbols for two different RS code words, which are sent to two different FEC circuits in the receiver (e.g., the FEC circuits 150 in FIG. 1).

In one embodiment, the bit-interleaved data received on Lane 0 and Lane 1 are stored column-by-column in the memories 505 and 510. That is, the bits for symbols 0-4 of RS1 are stored in the first 8 columns of the memory 505 while the bits for symbols 0-4 of RS2 are stored in the last 8 columns of the memory 505. Similarly, the bits for symbols 5-9 of RS1 are stored in the first 8 columns of the memory 510 while the bits for symbols 5-9 of RS2 are stored in the last 8 columns of the memory 510. As discussed above, doing so puts the bits for one symbol on the same row of the memory.

Moreover, while FIG. 5 illustrates two memories, they can also be four separate memories. That is, each lane could store data in two memories rather than one memory as shown.

FIG. 5 illustrates reading out the data in the memories 505 and 510 in a row-by-row manner. That is, while the data is stored in the memories 505 and 510 column-by-column, the data is read from the memories 505 and 510 row-by-row. Further, in order to interleave the data with non-consecutive symbols, the data is alternatively read from the memories 505 and 510.

At block 415, the reorganizer retrieves a 2-byte word from the memory. That is, instead of switching between the memories each time a byte is read (as is done in FIG. 3), here the reorganizer reads two bytes from each memory before then reading two bytes from the other memory. Moreover, the two bytes read from each memory are from symbols in different RS code words (e.g., RS1 and RS2). Referring to the example in FIG. 5, the byte 515A of Symbol 0 of RS1 is read from the first 8 bits in the first row of the memory 505. Then, the byte 515B of Symbol 0 of RS2 is read from the last 8 bits in the first row of the memory 505.

At block 420, the reorganizer interleaves the 2-byte word with other 2-byte words. That is, after retrieving the two-bytes from the memory 505, the reorganizer then switches to the memory 510 where byte 515C of Symbol 5 of RS1 is read from the first 8 bits of the first row of the memory 510 and byte 515D of Symbol 5 of RS2 is read from the last 8 bits of the first row of the memory 510, and so forth. This results in generating the byte-interleaved data 525 where not only are the symbols of the same RS code word interleaved, but also symbols from different RS code words are interleaved. That is, Symbol 0 for RS1 is next to Symbol 0 for RS2, and Symbol 5 for RS1 is next to Symbol 5 of RS2, and so forth.

One advantage of interleaving the symbols of different RS code words is the burst error is distributed over multiple FEC circuits. That is, referring back to FIG. 3, the byte-interleaved data 125 contains consecutive symbols for the same RS (i.e., RS1). Thus, these symbols are all sent to the same FEC circuit for error correction at the receiver. Thus, if there is a burst error that affects nine consecutive symbols, it will exceed the capability of the FEC circuit tasked with correcting the RS code word (i.e., RS1).

In contrast, the byte-interleaved data 525 interleaves the symbols of different RS code words. In this case, a burst error that affects nine consecutive symbols (e.g., RS1 sym0, RS2 sym0, RS1 sym5, RS2 sym5, RS1 sym1, RS2 sym1, RS1 sym6, RS2 sym6, and RS1 sym3) would not exceed the capabilities of the FEC circuits since five of these nine symbols are corrected by one RS-FEC circuit (e.g., RS1 sym0, RS1 sym5, RS1 sym1, RS1 sym6, and RS1 sym3) and the other four symbols are corrected by a different RS-FEC circuit (e.g., RS2 sym0, RS2 sym5, RS2 sym2, and RS2 sym6) since they below to a different RS code word. Thus, interleaving the symbol of different RS code words such that a second byte for a second FEC circuit immediately follows a first byte for a first FEC circuit can make the OTN more tolerant of longer burst errors (e.g., by a factor of two or more) relative to the byte-interleaved data 125 in FIG. 3.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A device, comprising:

a transmitter configured to:
- receive interleaved bits for different symbols to be transmitted in an optical transport network (OTN),
- re-order the interleaved bits into interleaved bytes, wherein each of the interleaved bytes corresponds to one of the different symbols, and
- transmit the interleaved bytes on the OTN, wherein transmitting the interleaved bytes comprises:
  - transmitting, to a receiver in the OTN, a first byte for a first Forward Error Correction (FEC) circuit in the receiver, and
  - transmitting, to the receiver, a second byte for a second FEC circuit in the receiver, wherein the second byte immediately follows the first byte.

2. The device of claim 1, wherein reordering the interleaved bits comprises:

storing the interleaved bits into a memory in the transmitter; and reading out the interleaved bits from the memory such that the bits for one byte are read out together.

3. The device of claim 2, wherein storing the interleaved bits into the memory comprises storing the interleaved bits into a column of the memory, wherein reading out the interleaved bits comprises reading out a row of the memory, wherein each row stores the bits for one corresponding byte of one of the different symbols.

4. The device of claim 2, wherein storing the interleaved bits into the memory comprises storing the interleaved bits into a row of the memory, wherein reading out the interleaved bits comprises reading out a column of the memory, wherein each column stores the bits for one corresponding byte of one of the different symbols.

5. The device of claim 1, wherein the different symbols are Reed-Solomon symbols.

6. The device of claim 1, wherein the interleaved bytes are combined from two lanes compatible with Optical channel Transport Lane (OTL) 4.4.

7. The device of claim 1, wherein the transmitter is configured to:

transmit, to the receiver, a third byte for the first FEC circuit in the receiver, wherein the third byte immediately follows the second byte; and transmit, to the receiver, a fourth byte for the second FEC circuit in the receiver, wherein the fourth byte immediately follows the third byte, wherein the first and third bytes are part of a first code word and the second and fourth bytes are part of a second code word.

8. A method comprising:

providing, at a transmitter, interleaved bits for different symbols to be transmitted in an optical transport network (OTN);

re-ordering the interleaved bits into interleaved bytes, wherein each of the interleaved bytes corresponds to one of the different symbols; and transmitting the interleaved bytes on the OTN to a receiver, wherein transmitting the interleaved bytes comprises:

transmitting, to the receiver, a first byte for a first Forward Error Correction (FEC) circuit in the receiver; and transmitting, to the receiver, a second byte for a second FEC circuit in the receiver, wherein the second byte immediately follows the first byte.

9. The method of claim 8, wherein reordering the interleaved bits comprises:

storing the interleaved bits into a memory; and reading out the interleaved bits from the memory such that the bits for one byte are read out together.

10. The method of claim 9, wherein storing the interleaved bits into the memory comprises storing the interleaved bits into a column of the memory, wherein reading out the interleaved bits comprises reading out a row of the memory, wherein each row stores the bits for one corresponding byte of one of the different symbols.

11. The method of claim 9, wherein storing the interleaved bits into the memory comprises storing the interleaved bits into a row of the memory, wherein reading out the interleaved bits comprises reading out a column of the memory, wherein each column stores the bits for one corresponding byte of one of the different symbols.

12. The method of claim 8, wherein the different symbols are symbols in an error correction code.

13. The method of claim 8, wherein the interleaved bytes are combined from two lanes compatible with Optical channel Transport Lane (OTL) 4.4.

14. The method of claim 8, further comprising:

transmitting, to the receiver, a third byte for the first FEC circuit in the receiver, wherein the third byte immediately follows the second byte; and transmitting, to the receiver, a fourth byte for the second FEC circuit in the receiver, wherein the fourth byte immediately follows the third byte, wherein the first and third bytes are part of a first code word and the second and fourth bytes are part of a second code word.

15. A device, comprising:

a receiver configured to receive interleaved bytes from a transmitter in an OTN, wherein each of the interleaved bytes corresponds to a different symbol of an error correction code, wherein the interleaved bytes were re-ordered from interleaved bits at the transmitter;

a first Forward Error Correction (FEC) circuit configured to correct errors in the interleaved bytes; and a second FEC circuit, wherein the interleaved bytes comprise a first byte for the first FEC circuit and a second byte for the second FEC circuit, wherein the second byte immediately follows the first byte.

16. The device of claim 15, wherein the different symbol is a Reed-Solomon symbol.

17. The device of claim 15, wherein the interleaved bytes comprise a third byte for the first FEC circuit, wherein the third byte immediately follows the second byte, and the interleaved bytes comprise a fourth byte for the second FEC circuit, wherein the fourth byte immediately follows the third byte, and wherein the first and third bytes are part of a first code word and the second and fourth bytes are part of a second code word.

* * * * *